United States Patent [19]
Durand

[11] Patent Number: 6,076,247
[45] Date of Patent: Jun. 20, 2000

[54] METHOD OF CONNECTING A BALL AND SOCKET JOINT TO A CONTROL ARM IN A VEHICLE SUSPENSION SYSTEM

[75] Inventor: Robert D. Durand, Reading, Pa.

[73] Assignee: Dana Corporation, Toledo, Ohio

[21] Appl. No.: 09/135,131

[22] Filed: Aug. 17, 1998

[51] Int. Cl.[7] .................................................. B21D 39/00
[52] U.S. Cl. ................................ 29/505; 29/510; 29/511; 29/515; 403/122; 403/279; 403/52; 403/281
[58] Field of Search .............................. 29/509, 510, 511, 29/515; 403/122, 279, 52, 281, 282; 280/93.511

[56] References Cited

U.S. PATENT DOCUMENTS

| | | | |
|---|---|---|---|
| 2,251,936 | 8/1941 | Heftler | 280/93.511 |
| 2,405,458 | 8/1946 | Slack et al. | |
| 2,553,743 | 5/1951 | Booth | 280/93.511 |
| 3,126,612 | 3/1964 | Poirier | |
| 3,177,020 | 4/1965 | Dumpis | |
| 3,237,278 | 3/1966 | White | |
| 3,305,617 | 2/1967 | Dumpis | |
| 3,734,697 | 5/1973 | Sieghartner | 29/509 |
| 3,984,132 | 10/1976 | Sarson | 29/509 |
| 4,016,958 | 4/1977 | Yoak | 29/509 |
| 4,182,193 | 1/1980 | Schultz | 29/509 |
| 4,364,159 | 12/1982 | Holcombe | 29/509 |
| 4,450,618 | 5/1984 | Ridenour | 29/509 |
| 4,652,169 | 3/1987 | Matthews | 29/509 |
| 5,822,859 | 10/1998 | Kessen | 29/509 |

*Primary Examiner*—Irene Cuda
*Assistant Examiner*—Anthony L. Green
*Attorney, Agent, or Firm*—MacMillan, Sobanski & Todd, LLC

[57] ABSTRACT

A method for connecting a ball and socket joint to a control arm in a vehicle suspension system includes providing the ball and socket joint with a socket portion having a circumferential flange. The ball and socket joint is initially aligned with an opening formed through an outer portion of the control arm. Then, the ball and socket joint is moved upwardly such that the socket portion is received within the opening. The socket portion defines an outer diameter that is preferably slightly smaller than an inner diameter defined by the opening formed through the outer portion of the lower control arm. However, the flange defines an outer diameter that is preferably larger than an inner diameter defined by that opening. Thus, the engagement of the flange with the lower surface of the outer portion positively positions the ball and socket joint relative to the lower control arm. Then, one or more regions of the socket portion of the ball and socket joint are deformed into engagement with the upper surface of the outer portion of the lower control arm. The deformed regions cooperate with the flange to trap the corresponding portions of the outer portion of the lower control arm therebetween. As a result, the ball and socket joint is securely connected to the lower control arm.

8 Claims, 4 Drawing Sheets

METHOD OF CONNECTING A BALL AND SOCKET JOINT TO A CONTROL ARM IN A VEHICLE SUSPENSION SYSTEM

BACKGROUND OF THE INVENTION

This invention relates in general to independent suspension systems for supporting a vehicle frame assembly on the wheels of a vehicle. In particular, this invention relates to an improved method for connecting a ball and socket joint to one or both of the upper and lower control arms in such an independent suspension system.

Virtually all land vehicles in common use, such as automobiles, vans, and trucks, include a frame assembly that is supported upon a plurality of ground-engaging wheels by a resilient suspension system. The structures of known vehicle frame assemblies can be divided into two general categories, namely, separate and unitized. In a typical separate vehicle frame assembly, the structural components of the body portion and the frame portion are separate and independent from one another. When assembled, the frame portion of the assembly is resiliently supported upon the vehicle wheels by the suspension system and serves as a platform upon which the body portion of the assembly and other components of the vehicle can be mounted. Separate vehicle frame assemblies of this general type are found in most older vehicles, but remain in common use today for many relatively large or specialized use modern vehicles, such as large vans, sport utility vehicles, and trucks. In a typical unitized vehicle frame assembly, the structural components of the body portion and the frame portion are combined into an integral unit which is resiliently supported upon the vehicle wheels by the suspension system. Unitized vehicle frame assemblies of this general type are found in many relatively small modern vehicles, such as automobiles and minivans.

In both separate and unitized types of vehicle frame assemblies, the suspension system resiliently supports the vehicle frame assembly on the rotatable wheels of the vehicle. One type of suspension system commonly used in both automobiles and trucks is an independent suspension system. In an independent suspension system, the vehicle frame assembly is supported individually upon each of the wheels of the vehicle such that each of the wheels can move upwardly and downwardly relative to the vehicle frame assembly independently of the other wheels. Thus, when a bump or a depression in the road upon which the vehicle is operated is encountered by one of the wheels, the other wheels are not moved upwardly and downwardly in response thereto. As a result, the independent suspension system provides a relatively smooth ride.

A typical structure for an independent suspension system includes a lower control arm and, in some instances, an upper control arm for each wheel of the vehicle. The upper and lower control arms are typically V-shaped, each having a pair of inner ends that are connected to the vehicle frame structure for pivoting movement in a generally vertical plane and an intermediate outer portion. The outer portions of the upper control arm and the lower control arm are connected through respective ball and socket joints to the upper and lower ends of a steering knuckle. A wheel spindle extends outwardly from the steering knuckle between the upper and lower ends thereof, and a hub and wheel assembly is mounted on the outer end of the wheel spindle. The pivoting connections of the upper and lower control arms to the vehicle frame assembly allow the wheels to move upwardly and downwardly, while maintaining the rotational axis of the wheel generally parallel with the road upon which the vehicle is operated. The two ball and socket joints permit rotational movement of the steering knuckle and wheel spindle relative to the vehicle frame assembly, while accommodating a limited amount of angular movement between the upper and lower ends of the steering knuckle and the respective upper and lower control arms connected thereto during the vertical pivoting movement.

As mentioned above, the outer portions of the upper and lower control arms are connected to respective ball and socket joints. Traditionally, this connection has been accomplished forming an aperture through the outer portion of the control arm and inserting the socket portion of the ball and socket joint through this aperture. A circumferential flange provided on the socket portion of the ball and socket joint abuts the control arm to properly position the ball and socket joint and to bear the load of the vehicle on the associated wheel. A number of methods are known in the art for retaining the socket portion of the ball and socket joint in the control arm aperture. In some instances, the socket portion is sized to be press fit within the aperture. In other instances, a plurality of rivets or other mechanical fasteners extend through respective apertures formed through the circumferential flange and the control arm.

Although known retaining methods have been effective, it has been found that in some instances, the control arm may be formed having a configuration that provides such a small physical space that the use of traditional rivets and other mechanical fasteners is difficult at best. Also, it has been found that the apertures formed through the control arm to accommodate such rivets and other mechanical fasteners may introduce undesirable weaknesses therein. Thus, it would be desirable to provide an improved method for connecting a ball and socket joint to a control arm in a vehicle suspension system that avoids these problems.

SUMMARY OF THE INVENTION

This invention relates to an improved method for connecting a ball and socket joint to a control arm in a vehicle suspension system. The ball and socket joint includes a ball portion that is disposed within a socket portion having a circumferential flange. The ball and socket joint is initially aligned with an opening formed through an outer portion of the control arm. Then, the ball and socket joint is moved upwardly such that the socket portion is received within the opening. The socket portion defines an outer diameter that is preferably slightly smaller than an inner diameter defined by the opening formed through the outer portion of the lower control arm. However, the flange defines an outer diameter that is preferably larger than the inner diameter defined by that opening. Thus, the engagement of the flange with the lower surface of the outer portion positively positions the ball and socket joint relative to the lower control arm. Then, one or more regions of the socket portion of the ball and socket joint are deformed into engagement with the upper surface of the outer portion of the lower control arm. The deformed regions cooperate with the flange to trap the corresponding portions of the outer portion of the lower control arm therebetween. As a result, the ball and socket joint is securely connected to the lower control arm.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
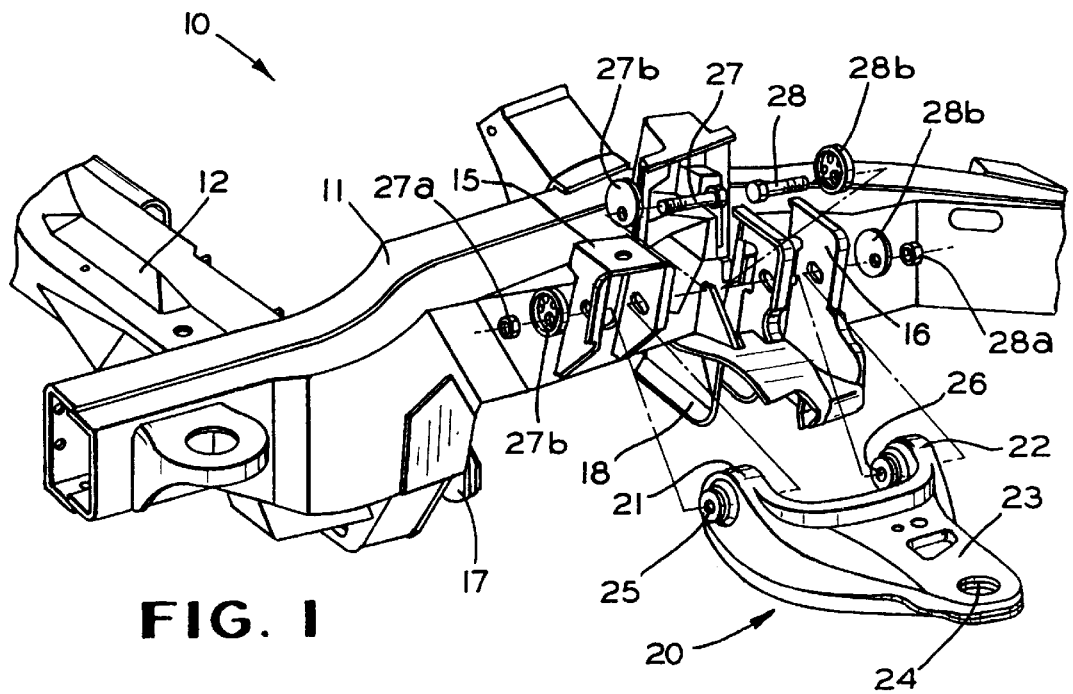
FIG. 1 is an exploded perspective view of a first portion of a vehicle frame assembly including an upper control arm in accordance with an initial step in the method of this invention.
Figure 2:
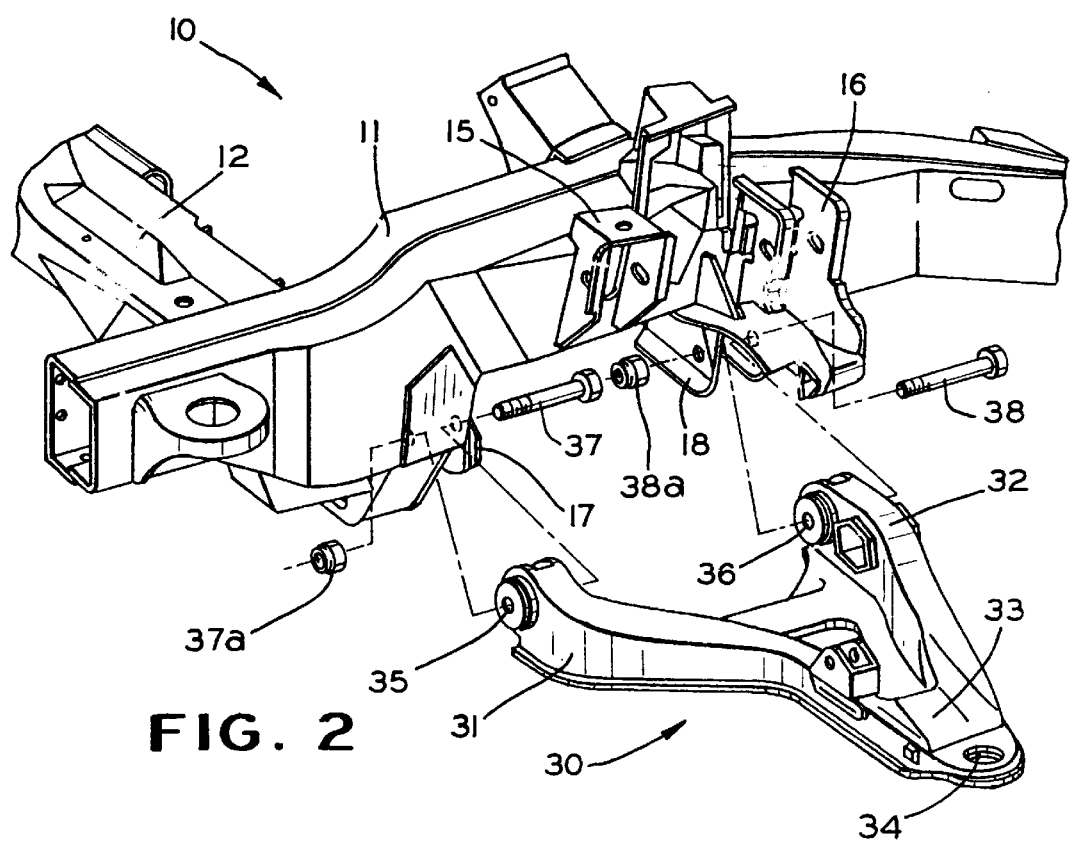
FIG. 2 is an exploded perspective view of a second portion of a vehicle frame assembly including a lower control arm in accordance with an initial step in the method of this invention.

Referring now to the drawings, there are illustrated in FIGS. 1 and 2 first and second portions of a vehicle frame structure, indicated generally at 10. The illustrated vehicle frame structure 10 is a conventional ladder type perimeter frame assembly, including a pair of longitudinally extending side rails (one of which is shown at 11) having a plurality of cross members (one of which is shown at 12) extending generally transversely therebetween. Vehicle frame structures of this general type are well known in the art. Thus, for the sake of simplicity, only those portions of the vehicle frame structure 10 which are necessary for a full understanding of this invention are illustrated.

The vehicle frame structure 10 includes a pair of upper control arm mounting brackets 15 and 16 that are secured to the upper portion of the first side rail 11 by conventional means, such as by welding. The first upper control arm mounting bracket 15 includes a central web having a pair of spaced apart support panels extending generally perpendicularly outwardly therefrom. Each of the support panels has an opening formed therethrough. The openings are generally longitudinally aligned with one another, for a purpose that will be explained below. The second upper control arm mounting bracket 16 is formed in a similar manner, including a central web and a pair of spaced apart support panels having respective aligned openings formed therethrough. Similarly, the vehicle frame structure 10 also includes a pair of lower control arm mounting brackets 17 and 18 that are secured to the lower surface of the first side rail 11 by conventional means, such as by welding. The first lower control arm mounting bracket 17 includes a central web having a pair of spaced apart support panels extending generally perpendicularly outwardly therefrom. Each of the support panels has an opening formed therethrough. The openings are generally longitudinally aligned with one another, for a purpose that will also be explained below. The second lower control arm mounting bracket 18 is formed in a similar manner, including a central web and a pair of spaced apart support panels having respective aligned openings formed therethrough.

An independent suspension system is provided for supporting the vehicle frame structure 10 on the wheels (not shown) of the vehicle. Referring to FIG. 1, the independent suspension system includes an upper control arm, indicated generally at 20, including a pair of inner legs 21 and 22 and an outer portion 23. An opening 24 formed through the outer portion 23 of the upper control arm 20 for a purpose that will be explained in detail below. The inner legs 21 and 22 are provided to pivotably secure the upper control arm 20 to the vehicle frame structure 10. To accomplish this, a hollow cylindrical bushing 25 is disposed in a longitudinally oriented aperture formed through the first inner leg 21 of the upper control arm 20. Similarly, a hollow cylindrical bushing 26 is disposed in a longitudinally oriented aperture formed through the second inner leg 22 of the upper control arm 20. The bushings 25 and 26 are preferably longitudinally aligned with one another.

To assemble the upper control arm 20 on the vehicle frame structure 10, the inner legs 21 and 22 of the upper control arm 20 are positioned such that the bushing 25 carried on the first inner leg 21 is longitudinally aligned with the openings formed through the support panels of the first upper control arm mounting bracket 15. At the same time, the bushing 26 carried on the second inner leg 22 of the upper control arm 20 is longitudinally aligned with the openings formed through the support panels of the second upper control arm mounting bracket 16. When this alignment has been achieved, a first threaded fastener 27 is passed through the bushing 25 and the openings formed through the support panels of the first upper control arm bracket 15 to pivotably connect the inner end of the first inner leg 21 of the upper control arm 20 to the vehicle frame structure 10. A nut 27a is then threaded onto the end of the first threaded fastener 27 to retain the first inner leg 22 of the upper control arm 20 on the vehicle frame structure 10. If desired, spacers or washers 27b may be provided between the enlarged head of the threaded fastener 27 and the adjacent support panel of the first upper control arm mounting bracket 15, and between the nut 27a and the adjacent support panel of the first upper control arm mounting bracket 15.

Similarly, a second threaded fastener 28 is passed through the bushing 26 and the openings formed through the support panels of the second upper control arm bracket 16 to pivotably connect the inner end of the second inner leg 22 of the upper control arm 20 to the vehicle frame structure 10. A nut 28a is threaded onto the second threaded fastener 28 to retain the second inner leg 23 of the upper control arm 20 on the vehicle frame structure 10. If desired, spacers or washers 28b may be provided between the enlarged head of the threaded fastener 28 and the adjacent support panel of the second upper control arm mounting bracket 16, and between the nut 28a and the adjacent support panel of the second upper control arm mounting bracket 16.

Referring now to FIG. 2, the independent suspension system further includes a lower control arm, indicated generally at 30, including a pair of inner legs 31 and 32 and an outer portion 33. An opening 34 is formed through the outer portion 33 of the lower control arm 30 for a purpose that will be explained in detail below. The inner legs 31 and 32 are provided to pivotably secure the lower control arm 30 to the vehicle frame structure 10. To accomplish this, a hollow cylindrical bushing 35 is disposed in a longitudinally oriented aperture formed through the first inner leg 31 of the lower control arm 30. Similarly, a hollow cylindrical bushing 36 is disposed in a longitudinally oriented aperture formed through the second inner leg 32 of the lower control arm 30. The bushings 35 and 36 are also preferably longitudinally aligned with one another.

To assemble the lower control arm 30 on the vehicle frame structure 10, the inner legs 31 and 32 of the lower control arm 30 are positioned such that the bushing 35 carried on the first inner leg 31 is longitudinally aligned with the openings formed through the support panels of the first lower control arm mounting bracket 17. At the same time, the bushing 36 carried on the second inner leg 32 of the lower control arm 30 is longitudinally aligned with the openings formed through the support panels of the second lower control arm mounting bracket 18. When this alignment has been achieved, a first threaded fastener 37 is passed through the bushing 35 and the openings formed through the first lower control arm mounting bracket 17 to pivotably connect the inner end of the first inner leg 31 of the lower control arm 30 to the vehicle frame structure 10. A nut 37a is then threaded onto the end of the first threaded fastener 37 to retain the first inner leg 32 of the lower control arm 30 on the vehicle frame structure 10. Similarly, a second threaded fastener 38 is passed through the bushing 36 and the openings formed through the support panels of the second lower control arm mounting bracket 18 to pivotably connect the inner end of the second inner leg 32 of the lower control arm 30 to the vehicle frame structure 10. A nut 38a is threaded onto the second threaded fastener 38 to retain the second inner leg 33 of the lower control arm 30 on the vehicle frame structure 10. Although not shown, spacers or washers may be provided between the enlarged head of the threaded fasteners 37 and 38 and the adjacent support panels of the first and second lower control arm mounting brackets 17 and 18 if desired.

As mentioned above, the vehicle frame structure 10 includes a second side rail (not shown) which, for the purpose of this discussion, is the functional equivalent of the first side rail 11 described above. Thus, similar upper and lower control arm mounting brackets are provided on the second side rail for pivotably securing similar upper and lower control arms thereto. The conventional independent suspension system thus far described may be provided for supporting the vehicle frame structure 10 on either or both of the front and rear wheels of the vehicle. It will also be appreciated that the illustrated independent suspension system is intended to be representative of any type of vehicular suspension system with which this invention can be used.

Figure 3:
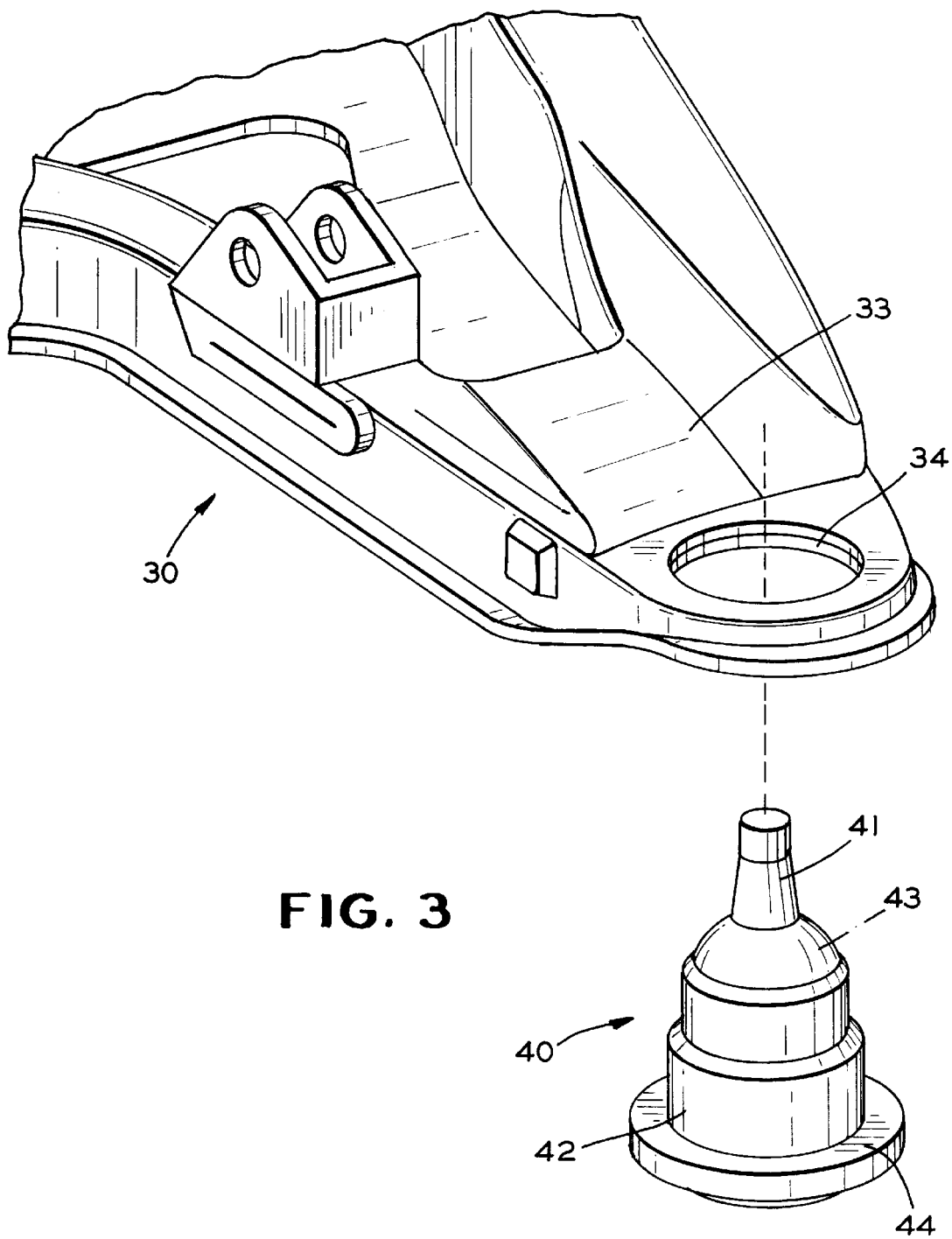
FIG. 3 is an enlarged exploded perspective view of a portion of the lower control arm illustrated in FIG. 2 and a ball and socket joint prior to installation on the lower control arm.

As shown in FIG. 3, a ball and socket joint, indicated generally at 40, is adapted to be inserted through the opening 34 formed through the outer portion 33 of the lower control arm 30. The ball and socket joint 40 is generally conventional in the art and includes a ball portion (not shown) having an outwardly extending shank 41 that is disposed within a socket portion 42. As is well known, the ball portion is supported for free rotational movement within the socket portion 42. A flexible dust guard 43 can be provided to prevent the entry of dirt, water, and other contaminants within the socket portion 42. A flange 44 is formed about the lower portion of the socket portion 42 of the ball and socket joint 40. The illustrated flange 44 extends completely about the circumference of the socket portion 42, although such is not necessary. If desired, the flange 44 may be embodied as one or more individual flange portions (not shown), each extending partially about the socket portion 42.

Figure 4:
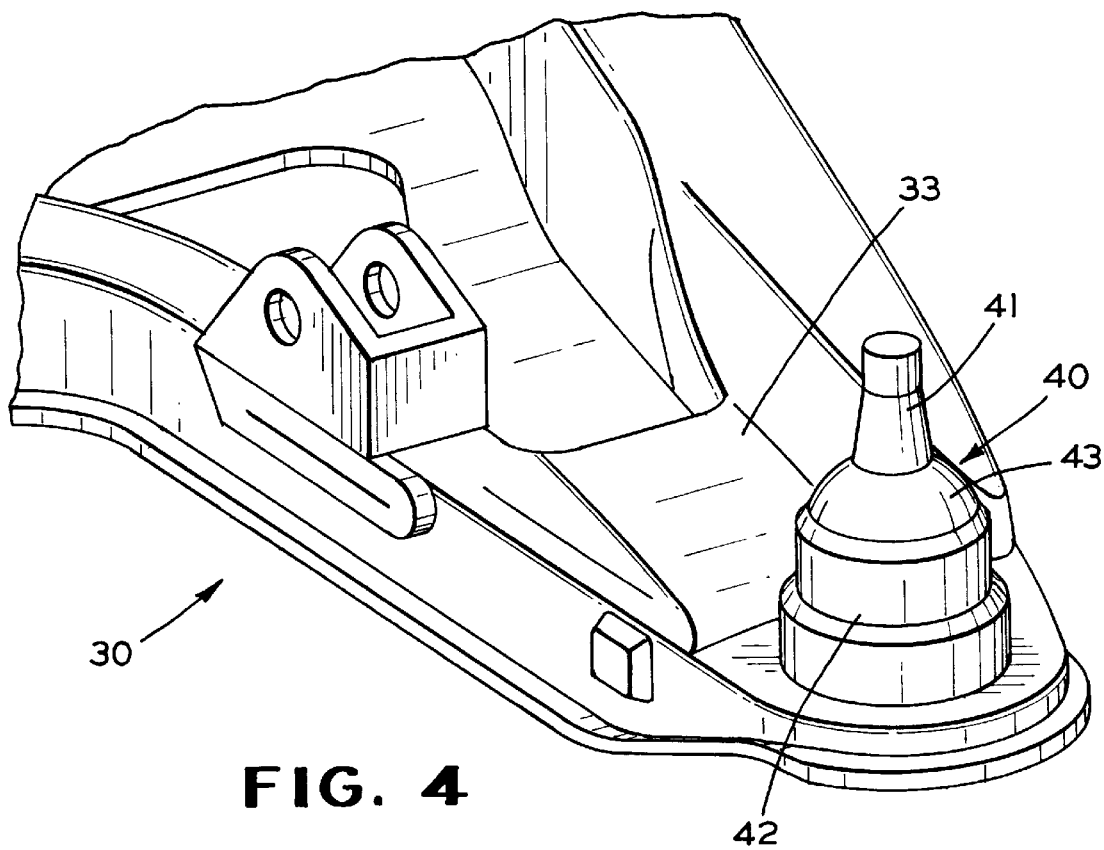
FIG. 4 is an enlarged exploded perspective view similar to FIG. 3 showing the ball and socket joint partially installed on the lower control arm.
Figure 5:
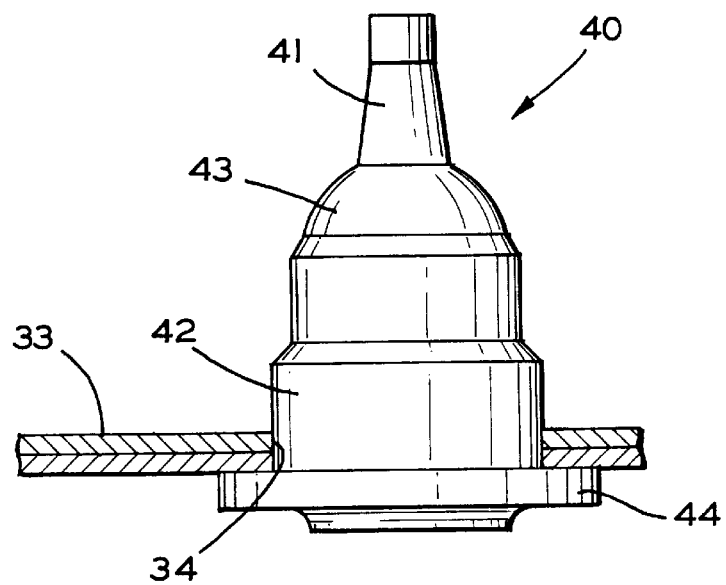
FIG. 5 is a sectional elevational view of the lower control arm and ball and socket joint illustrated in FIG. 4.
Figure 6:
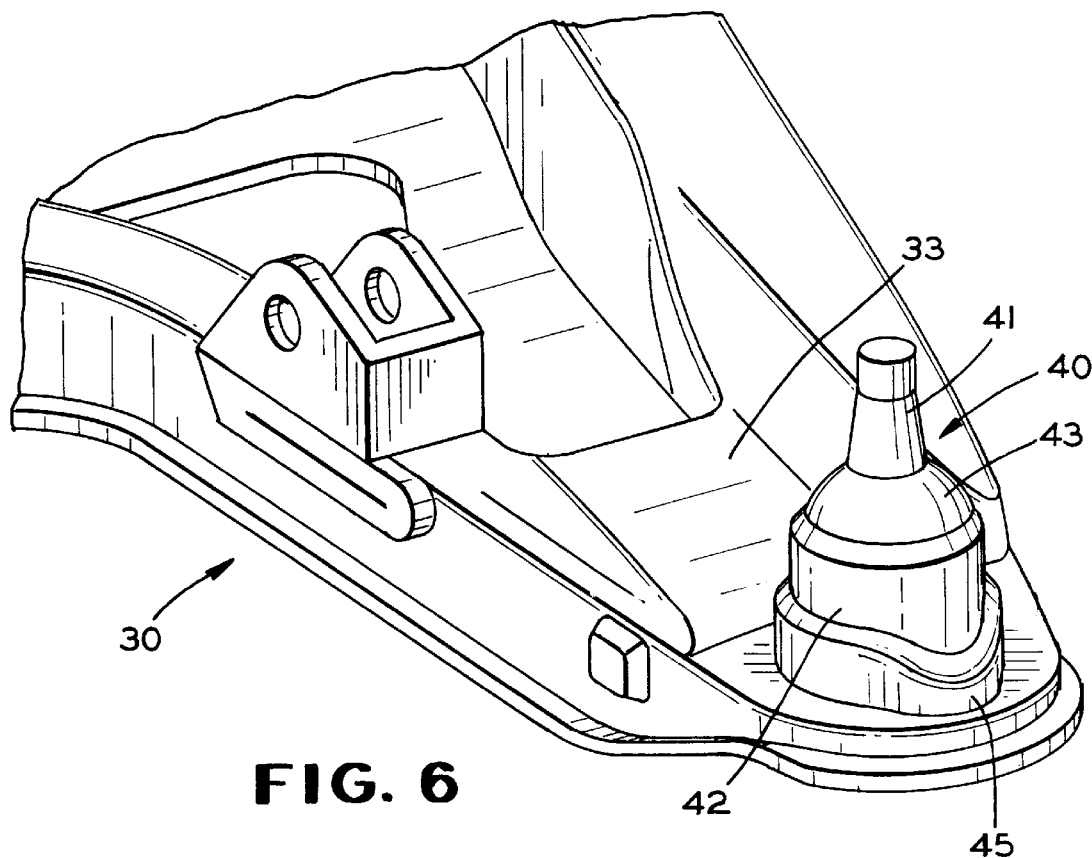
FIG. 6 is an enlarged exploded perspective view similar to FIG. 4 showing the ball and socket joint completely installed on the lower control arm.

To install the ball and socket joint 40 on the lower control arm 30, the joint 40 is initially oriented as shown in FIG. 3 such that the shank 41 is aligned with the opening 34. Then, the ball and socket joint 40 is moved upwardly such that the socket portion 42 is received within the opening 34, as shown in FIGS. 4 and 5. The socket portion 42 defines an outer diameter that is preferably slightly smaller than an inner diameter defined by the opening 34 formed through the outer portion 33 of the lower control arm 30. However, the flange 44 defines an outer diameter that is preferably larger than an inner diameter defined by the opening 34 formed through the outer portion 33 of the lower control arm 30.

Thus, further upward movement of the ball and socket joint 40 relative to the outer portion 33 of the lower control arm 30 is prevented. The engagement of the flange 44 with the lower surface of the outer portion 33 functions to positively position the ball and socket joint 40 relative to the lower control arm 30.

Figure 7:
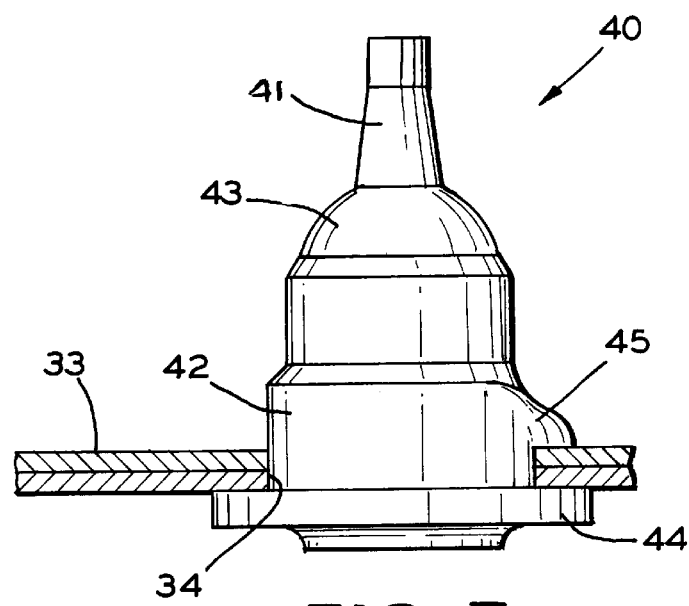
FIG. 7 is a sectional elevational view of the lower control arm and ball and socket joint illustrated in FIG. 6.

The final step of the method of this invention involves deforming one or more regions 45 of the socket portion 42 of the ball and socket joint 40 into engagement with the upper surface of the outer portion 33 of the lower control arm 30. As best shown in FIG. 7, the deformed regions 45 function with the flange 44 to trap the corresponding portions of the outer portion 33 of the lower control arm 30 therebetween. As a result, the ball and socket joint 30 is securely connected to the lower control arm 30. It has been found preferable to form three equidistantly spaced deformed regions 45 on the socket portion 42 of the ball and socket joint 40. However, a greater or lesser number of such deformed regions 45 may be formed, including a single deformed region 45 that extends partially or completely about the periphery of the socket portion 42. The circumferential extent of each of the deformed regions 45 can be varied as desired to accommodate the intended load to be applied thereto. The deformed regions 45 can be formed by any desired process, including (but not limited to) mechanical deformation, ultrasonic swaging, electromagnetic pulse deformation, and the like.

Although the method of this invention has been described and illustrated in the context of connecting the ball and socket joint 40 to the lower control arm 30, it will be appreciated that the same method may be used to connect the ball and socket joint 40 to the upper control arm 20. Once the ball and socket joints 40 have been installed on the upper and lower control arms 20 and 30, the shank portions 41 can be connected to a conventional steering knuckle and wheel spindle assembly (not shown) in a known manner.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of connecting a ball and socket joint to a control arm in a vehicle suspension system comprising the steps of:
   (a) providing a control arm including first and second surfaces and having an opening formed therethrough;
   (b) providing a ball and socket joint having a flange formed thereon;
   (c) inserting a portion of the ball and socket joint through the opening until the flange engages the first surface of the control arm; and
   (d) deforming a region of the ball and socket joint into engagement with the second surface of the control arm such that a portion of the control arm is trapped between the flange and the deformed region of the ball and socket joint.

2. The method defined in claim 1 wherein said step (b) is performed by providing a single continuous circumferential flange on the ball and socket joint.

3. The method defined in claim 1 wherein said step (c) is performed by forming the portion of the ball and socket joint having a diameter that is slightly smaller than a diameter defined by the opening.

4. The method defined in claim 1 wherein said step (d) is performed by deforming a single region of the ball and socket joint into engagement with the second surface of the control arm.

5. The method defined in claim 1 wherein said step (d) is performed by deforming a plurality of regions of the ball and socket joint into engagement with the second surface of the control arm.

6. The method defined in claim 1 wherein said step (d) is performed by mechanical deformation.

7. The method defined in claim 1 wherein said step (d) is performed by ultrasonic swaging.

8. The method defined in claim 1 wherein said step (d) is performed by electromagnetic pulse deformation.

* * * * *